(12) United States Patent
Reitze et al.

(10) Patent No.: US 12,129,189 B2
(45) Date of Patent: Oct. 29, 2024

(54) SYSTEM AND METHOD FOR INCREASING EVAPORATION FOR FLUID BODIES

(71) Applicant: SOLAR MULTIPLE, LLC, Littleton, CO (US)

(72) Inventors: Eric Reitze, Broomfield, CO (US); Keith Gawlik, Broomfield, CO (US)

(73) Assignee: SOLAR MULTIPLE, LLC, Littleton, CO (US)

( * ) Notice: Subject to any disclaimer, the term of this patent is extended or adjusted under 35 U.S.C. 154(b) by 0 days.

(21) Appl. No.: 17/986,425

(22) Filed: Nov. 14, 2022

(65) Prior Publication Data

US 2023/0150837 A1  May 18, 2023

Related U.S. Application Data

(60) Provisional application No. 63/279,554, filed on Nov. 15, 2021.

(51) Int. Cl.
| | | |
|---|---|---|
| C02F 1/12 | (2023.01) | |
| B01D 1/00 | (2006.01) | |
| B01D 1/14 | (2006.01) | |
| C02F 1/04 | (2023.01) | |
| B01D 1/16 | (2006.01) | |
| C02F 103/06 | (2006.01) | |

(52) U.S. Cl.
CPC .............. *C02F 1/12* (2013.01); *B01D 1/0005* (2013.01); *B01D 1/14* (2013.01); *C02F 1/043* (2013.01); *C02F 1/048* (2013.01); B01D 1/16 (2013.01); C02F 2103/06 (2013.01); C02F 2201/005 (2013.01)

(58) Field of Classification Search
CPC .. C02F 1/043; C02F 1/048; C02F 1/12; C02F 2103/06; C02F 2201/005; B01D 1/0005; B01D 1/14; B01D 1/16
See application file for complete search history.

(56) References Cited

U.S. PATENT DOCUMENTS

| 4,449,849 A | * | 5/1984 | Horn ..................... E21B 21/065 |
| | | | 405/52 |
| 4,613,409 A | * | 9/1986 | Volland .................. F24S 10/13 |
| | | | 159/901 |
| 7,448,600 B1 | * | 11/2008 | Boulter ................... E21B 21/06 |
| | | | 261/78.2 |

(Continued)

FOREIGN PATENT DOCUMENTS

| JP | 60168583 A | * | 9/1985 | ............... C02F 1/12 |
| WO | WO-2019043982 A1 | * | 3/2019 | ............... B01D 1/20 |

OTHER PUBLICATIONS

JPS60168583 IP com Machine Translation Obtained Apr. 22, 2024. (Year: 2024).*

(Continued)

*Primary Examiner* — Jonathan Miller
(74) *Attorney, Agent, or Firm* — Dorsey & Whitney LLP

(57) ABSTRACT

The present disclosure includes systems and methods for enhancing evaporation rates of a fluid, such as fluid including dissolved solids (e.g., a wastewater pond). In one example, a system includes a pump configured to pressurize air and an agitation assembly fluidly coupled to the pump, where the agitation assembly is configured to emit an air stream that impacts a top surface of the fluid body to generate droplets.

28 Claims, 7 Drawing Sheets

(56) References Cited

U.S. PATENT DOCUMENTS

| | | | | |
|---|---|---|---|---|
| 7,604,710 | B2* | 10/2009 | Haslem | B01D 1/20 |
| | | | | 405/224.1 |
| 7,874,548 | B1* | 1/2011 | McGuffin | C02F 7/00 |
| | | | | 261/123 |
| 8,016,977 | B2* | 9/2011 | Rasmussen | B05B 1/202 |
| | | | | 159/901 |
| 8,985,556 | B2* | 3/2015 | Boulter | C02F 1/048 |
| | | | | 261/78.2 |
| 9,969,626 | B2* | 5/2018 | Gawlik | B01D 1/0058 |
| 10,519,044 | B2* | 12/2019 | Noles, Jr. | B01F 23/23121 |
| 10,787,372 | B1* | 9/2020 | Blanchard | B01D 1/2896 |
| 11,220,439 | B2* | 1/2022 | Lee | C02F 1/10 |
| 2011/0168646 | A1* | 7/2011 | Tafoya | B01D 1/14 |
| | | | | 210/180 |
| 2012/0216963 | A1* | 8/2012 | Tafoya | B01D 1/14 |
| | | | | 159/4.01 |
| 2018/0186659 | A1* | 7/2018 | Noles, Jr. | B01D 3/346 |
| 2019/0314735 | A1* | 10/2019 | Ballantyne | C02F 1/14 |
| 2022/0119277 | A1* | 4/2022 | Palutis | C02F 1/12 |

OTHER PUBLICATIONS

Steven M Spar, JP60168583 Human Translation by USPTO Translations Service Center Aug. 15, 2024. (Year: 2024).*

* cited by examiner

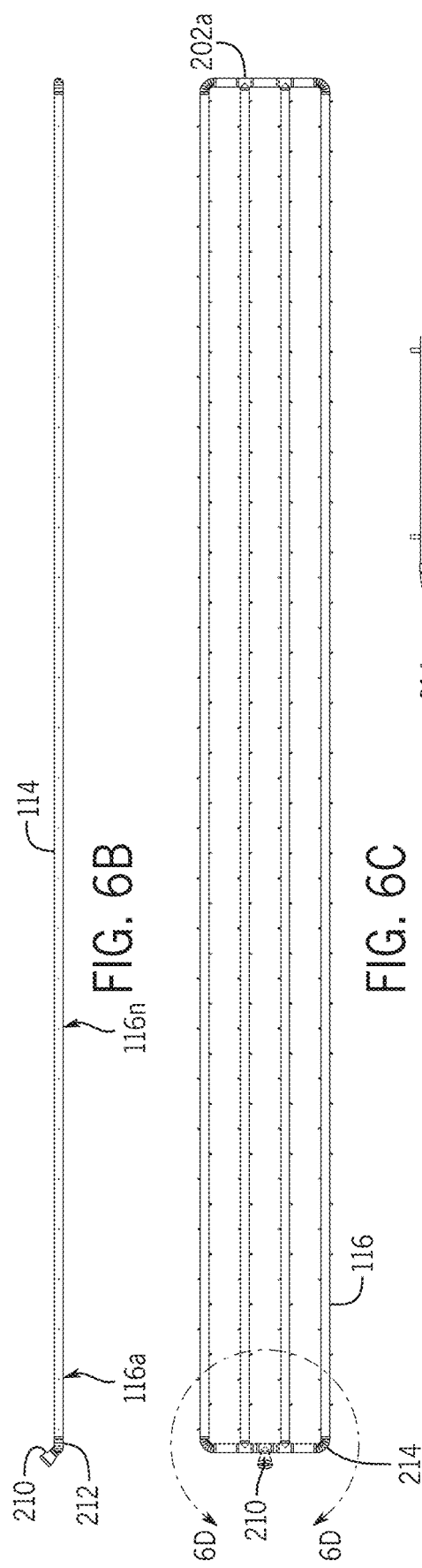
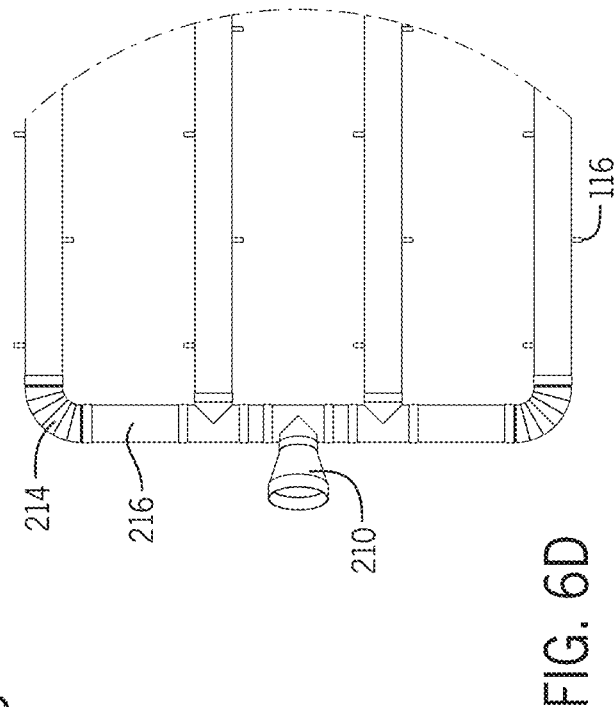
FIG. 6B
FIG. 6C
FIG. 6D

SYSTEM AND METHOD FOR INCREASING EVAPORATION FOR FLUID BODIES

CROSS REFERENCE TO RELATED APPLICATIONS

The present application claims priority to U.S. Provisional Application No. 63/279,554 titled "System and Method for Increasing Evaporation for Fluid Bodies," filed on Nov. 15, 2021 and incorporated by reference herein for all purposes.

FIELD

The present disclosure generally relates to systems for evaporating liquids, such as liquid waste or contaminated water.

BACKGROUND

Many industrial processes (e.g., harvesting salt from seawater, desalination plants, separating produced water from mine tailings, oil fracking processes, and other similar processes that produce waste water) generate large volumes of contaminated water that cannot be disposed of by draining it into the local watershed. The large volume of water combined with these contaminants makes it difficult and expensive to transport the waste water to a treatment facility. Removing the water from the contaminants facilitates disposal by reducing the amount of waste to be managed. In other applications, water removal can also be used to attain a desirable good such as sea salt. In these situations, it is important to have an efficient and low cost method of removing the water to minimize production costs.

To address these issues, evaporation ponds are commonly used to concentrate materials by removing water. Evaporation ponds or pools are artificial ponds with large surface areas that expose a liquid mixture to air, solar radiation, and ambient temperatures. Exposure to ambient conditions causes the water to evaporate and contaminants or other materials that had been dissolved and/or suspended with the water to be left in the pond. However, evaporation from these ponds is highly dependent on the ambient conditions. To have a sufficiently high evaporation rate, the surface area of the ponds needs to be very large, creating ponds that take up vast amounts of space. The large size of the ponds makes them expensive to construct and places constraints on where they can be built. Additionally, since the evaporation rate is related to the ambient temperature, little to no evaporation may take place in cold conditions.

SUMMARY

In one embodiment, a system for assisting in evaporation of a fluid body is disclosed. The system may include a pump configured to pressurize air and an agitation assembly fluidly coupled to the pump. The agitation assembly is configured to emit an air stream that impacts a top surface of the fluid body to generate droplets.

In one embodiment, a method for evaporating fluid is disclosed. The method includes pressurizing air received from an environment surrounding the fluid, generating an air stream from the pressurized air, and applying the air stream to a top surface of the fluid to agitate the fluid, where the agitation generates a spray of fluid into the air to encourage evaporation of the fluid.

In one embodiment, a system for evaporating a wastewater pond is disclosed. The system includes a pump configured to pressurize an agitation fluid and an agitation assembly fluidly coupled to the pump, where the agitation assembly emits a jet of the agitation fluid that impacts a top surface of the wastewater pond to generate droplets.

BRIEF DESCRIPTION OF THE DRAWINGS

FIG. 6B illustrates a side elevation view of a submodule for the system of FIG. 6A.

FIG. 6C illustrates a top plan view of the submodule of FIG. 6A.

FIG. 6D illustrates an enlarged view as shown in FIG. 6C.

DETAILED DESCRIPTION

Figure 1:
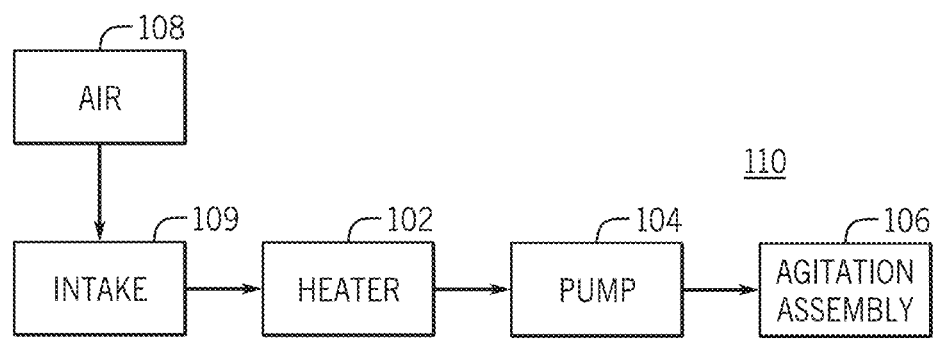
FIG. 1 illustrates a block diagram of an example of an evaporation system.

The present disclosure includes a system and method for increasing the evaporation rate for a body of fluid, such as an evaporation pond or pool. The system includes a pump or blower that provides fluid (e.g., air, gases, and/or a mixture thereof) to an agitation assembly. The agitation assembly includes one or more nozzles or other outlets configured to generate a stream or jet that interacts with a portion of the fluid, e.g., a top or upper surface, to agitate the fluid body. For example, the nozzles may direct the jet at the fluid (e.g., wastewater) to cause the fluid to splash and generate droplets, increasing the surface area of the fluid particles exposed to the ambient environment. The increased surface area and smaller volume of the fluid increase the evaporation rate for the fluid. The system may include multiple nozzles arranged to have staggered spray volumes, helping to maximize the area of the fluid impacted and agitated by the agitation assembly. It should be noted that although the term "air" is used herein, in many implementations, the generated streams or jets may be other types of fluids, including, but not limited to, gases (e.g., $CO_2$), and/or mixtures or combinations of the same. Further, in some embodiments, the air received into the system may be ambient air, but in other embodiments, the air or fluid may be received from other locations or elements within the system, e.g., exhaust from a turbine or the like. In short, various elements may be used as the agitation element within the system, and the examples discussed below are meant as illustrative only.

In some embodiments, the system may include a heater, such as a solar collector, fuel burner, or waste heat recovery system, that increases the temperature of the air used to generate the air jets. In these embodiments, the temperature of the air jets may further act to assist in heating the fluid and assisting in causing a state change for the fluid (e.g., to turn to gas and evaporate). In instances where the air is heated, the heating process may act to lower the relative humidity of the air (e.g., reduce the vapor pressure) allowing the air to absorb more water or fluid when provided to the body of fluid via the agitation assembly. In other embodiments, the air may be treated to remove humidity without requiring a separate heating operation.

In some embodiments, the agitation assembly may include one or more pipes or tubes that define an air distribution network. The pipes may be configured to be positioned on or float on the fluid. In other examples, the pipes may be raised above the surface of the fluid, e.g. supported by one or more supports or pillars. In these configurations, the pipes can be configured to orient the nozzles relative to the fluid surface to maximize agitation and generate desired spray patterns. The pipes may be configured to increase the temperature of the fluid as well, e.g., may include coatings or properties that help to retain heat based on solar energy and may then distribute the energy to the fluid. Additionally or alternatively, the pipes may be coated or configured to assist in evaporation, such as including a hydrophilic coating, so as to assist in, distributing fluid splashes that land on the pipes to be evenly distributed and increase evaporation. In other words, the coating may help increase the surface area of any fluid droplets landing on the pipes.

As compared to conventional evaporation systems, the current system may have an increased evaporation rate and use less power. For example, in some systems that may release air bubbles into the fluid, such as under the top surface of the water, the pump for the air may have to overcome the fluid pressure of the fluid covering the outlets, requiring an increased pressure and thus energy for the system. Additionally, in such submerged systems, the outlets are positioned within the fluid and become subject to debris and scaling, e.g., debris within the fluid can block the outlets over time and/or contaminants within the fluid may form or become deposited on the system, clogging or occluding the outlets.

FIG. 1 illustrates a block diagram of a system for increasing evaporation rates. The system 100 may include a heater 102, a pump 104, and an agitation assembly 106 where air 108 or another agitation fluid is received as an input to the system 100 and expelled via the agitation assembly 106 into a body of fluid, e.g., wastewater). The system 100 may be positioned to be in fluid communication with a fluid body to be evaporated, such as an evaporation pond, waste pool, or the like.

The heater 102, which in some instances may be omitted from the system 100, heats the air 108 received with the system 100. For example, the air 108 or agitation fluid may be received from the surrounding environment and so may be at ambient temperature and pressure. The heater 102 increases the temperature of the air from the ambient temperature. The heater 102 may take many forms, such as, but not limited to, a solar heater or collector that transfers radiation energy to the air, a fuel burner that burns or otherwise utilizes a fuel or electricity to transfer energy to the air, geothermal heater, and/or a waste heat system that transfers heat generated from an industrial system to the air. It should be noted that in FIG. 1, the heater 102 is shown as being positioned upstream of the pump 104, in other embodiments, the heater 102 may be positioned downstream (e.g., receive pressurized fluid from the pump 104 and heat the pressurized fluid).

The pump 104 pulls the air 108 into the fluid system and may be in the form of a blower or compressor that increases the pressure of the air 108. The pump 104 generates a vacuum force to pull air into a chamber and then compresses the volume, increasing the pressure of the air 108. The type of pump 104 or compressor used may be varied based on the system 100 requirements and environment. For example, the size and output of the pump 104 may be based on the volume of fluid to be evaporated. In one embodiment, the pump 104 is a centrifugal blower, or air handling unit. In should be noted that the function of the pump 104 may also be replaced by other streams of pressurized fluid and a separate "pump component" may be omitted. For example, the pressurized fluid may be an exhaust from a turbine or other industrial element and may be provided to the system 100 already pressurized. In these cases, the pump 104 may be omitted or may be configured to supplement the pressure of the received agitation fluid. Further, as can be appreciated, some systems, such as very large evaporation ponds, may require multiple pumps 104 in order to generate the desired pressure and air flow.

The agitation assembly 106 is configured to apply one or more air jet streams or agitation streams to the fluid body. For example, the agitation assembly 106 may include a plurality of pipes or other flow structures (e.g. tubes) that receive the pressurized and optionally heated air 108 and nozzles or outlets that expel the air 108 across and/or partially into the surface of the fluid body. The agitation assembly 106 may be configured to be positioned on or raised just above the surface of the fluid and have air jets configured to maximize fluid splashes and generate droplets. The agitation assembly 106 may also be configured to increase the temperature of portions of the fluid body, such as by including one or more characteristics that allow or promote heat transfer from the agitation assembly 106 to the fluid body. In one example, the agitation assembly 106 may be coated or include a dark color, such as black, that may absorb solar energy, which may be passed to the fluid body. Similarly, as the air 108 may be heated by the heater 102, the agitation assembly 106 may help to transfer heat from the air 108 to the fluid body. The agitation assembly 106 may include agitation outlets, such as nozzles, that may be configured to generate a desired stream as the fluid exits the pipes. In some implementations, the nozzles may be angled towards the fluid body to generate a desired angle relative to the surface of the fluid body and/or the pipes may be angled to generate the desired angle. The nozzles or outlets may be formed with the pipes (e.g., via molding) or may be separately coupled to the pipes.

Figure 2A:
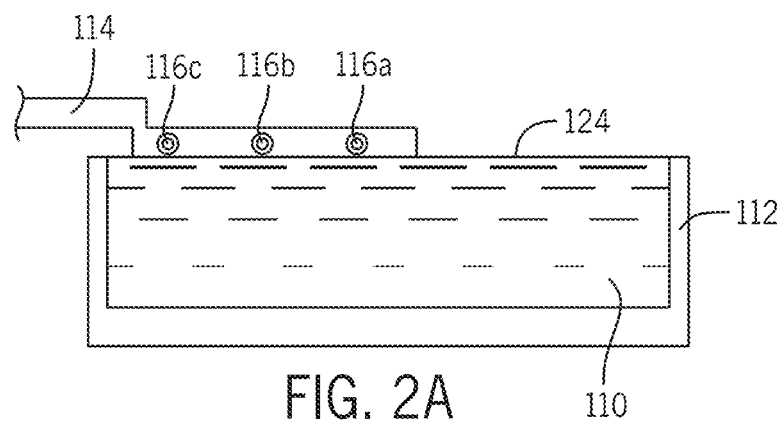
FIG. 2A illustrates a side elevation view of an agitation assembly positioned on a fluid body.
Figure 2B:
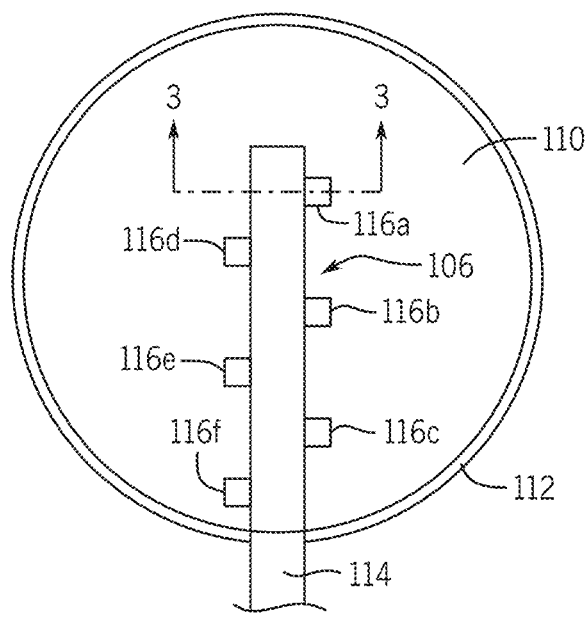
FIG. 2B illustrates a top plan view of the agitation assembly positioned on the fluid body.
Figure 3:
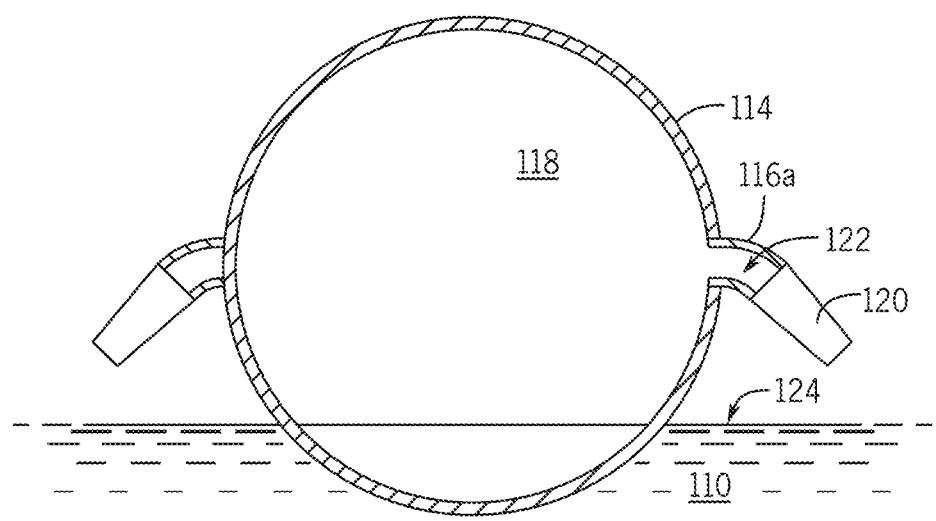
FIG. 3 illustrates a cross-section view of the agitation assembly of FIG. 2A taken along line 3-3 in FIG. 2B.

FIGS. 2A and 2B illustrate an example of the agitation assembly 106 installed on a fluid body 110. FIG. 3 illustrates a cross section of the agitation assembly 106 taken along line 3-3 in FIG. 2B. With reference to FIGS. 2A-3, in this example, the fluid body 110 may be an evaporation pond and be bound by one or more containment walls 112, where the containment walls 112 may be formed within the ground or with earth or may be constructed (e.g., concrete, plastic, or the like). The fluid body 110 may include waste water, salinated water, or other fluid desired to be reduced in volume. The fluid body 110 may be positioned in an outdoor environment or may be housed within an environment, such as an industrial plant or warehouse (e.g., formed as a boiler).

In this example, the agitation assembly 106 may include a distribution pipe 114 and a plurality of outlets 116a, 116b, 116c, 116d, 116e, 116f fluidly coupled thereto to define multiple branches from the main distribution pipe 114. As shown in FIGS. 2B and 3, the distribution pipe 114 may be formed as an elongated tube and may be substantially hollow to as to define a fluid lumen 118 therethrough. The pipe 114 may be formed of a variety of materials. In one example, the pipe 114 may be formed of high density polyethylene (HDPE) or aluminum composite material (ACP), however, in other embodiments, other types of materials may be used.

Additionally, the distribution or delivery pipe 114 may be configured to float on the fluid body 110, e.g., may have a weight sufficient to be buoyed in the fluid. For example, as shown in FIG. 3, a bottom surface of the pipe 114 may be positioned within the fluid and the top surface 124 of the fluid may surround and be adjacent to a lower portion of (e.g., lower 25% of the pipe 114) the pipe 114. In other examples, however, the pipe 114 may be supported within the fluid body, such as via pillars or support structures that are coupled to the bottom surface below the fluid body. In some examples, the delivery pipe 114 may be coupled to the pump 104 and a plurality of other pipes 114 to form a network or distribution system, e.g., such as via a manifold or other distribution structure. However, it should be understood that the arrangement and number of pipes 114 may be varied based on the size and configuration of the fluid body 110. For example, some fluid bodies 110 may be substantially large that multiple pipes 114 are required to allow efficient evaporation, whereas other bodies may be sufficiently small that one or two pipes 114 may be used.

In some embodiments, the pipes 114 may include features to enhance evaporation within the system 100. For example, the pipes 114 may include a dark color coating or material that absorbs energy, e.g., solar energy, and applies that to the fluid body as the pipes. 114 may be seated on the surface of the fluid body. In these instances, the application of the heat via the pipes 114 to the fluid body 110 may further encourage and enhance the overall evaporation of the fluid. In systems that may be completely submerged, the pipes may not absorb as much energy to assist in the evaporation as compared to the pipes 114 of the system 100. Alternatively or additionally, the pipes 114 may include a coating, such as a hydrophilic coating, that helps to disperse droplets across a larger surface area of the pipe 114, allowing the droplets to evaporate more quickly.

With continued reference to FIGS. 2B and 3, the outlets 116a, 116b, 116c, 116d, 116e, 116f may be coupled to the pipe 114. In one example, the outlets 116a, 116b, 116c, 116d, 116e, 116f may be formed as apertures within the sidewalls of the pipe 114. In another example, the outlets 116a, 116b, 116c, 116d, 116e, 116f may be formed as branches or prongs that extend outwards from the sidewalls of the pipe 114. In either implementation, however, the outlets 116a, 116b, 116c, 116d, 116e, 116f are in fluid communication with the fluid lumen 118 of the pipe 114. The outlets 116a, 116b, 116c, 116d, 116e, 116f may include an outlet lumen 122 that may define a pathway for the air 108 and is orientated at an angle to the fluid lumen 118 of the pipe 114. The outlets may be formed on two sides of the pipe, e.g., a first side and a second side, and at different longitudinal locations from one another (e.g., in a staggered implementation).

A nozzle 120 may be coupled to or formed on the end of the outlets 116a, 116b, 116c, 116d, 116e, 116f. The nozzle 120 may be formed integrally with the outlets 116a, 116b, 116c, 116d, 116e, 116f (such as via molding) or may be separately coupled thereto (e.g., via adhesive, threading, fasteners, or the like). The nozzle 120 may include an outlet aperture that defines a shape of the air jet expelled from the nozzle 120. The outlet aperture 128 (see FIG. 5A) may be varied in shape depending on the desired air jet characteristics, e.g., duck billed, square, round, etc. The nozzle 120 generally may be configured to increase the velocity of the agitation stream before it exits the pipe 114, e.g. have a reduced outlet diameter compared to the outlets of the pipe 114. In one example, the nozzle 120 may have a rounded edge to help prevent ingress of debris (e.g., salt or other materials) from entering into and possibly clogging the nozzle 120.

In some configurations, the nozzle 120 may further include features to generate a moving air jet. For example, the nozzle 120 may include a fluidic oscillator or other internal geometry that generates a moving outlet position of the air stream based on pressure or the like, e.g., the nozzle may be configured to generate a stream that moves as it exits. In other examples the nozzle 120 may have an active element (e.g., servo or motor) that actively moves the position of the nozzle 120 relative to the fluid body 110 to generate a moving (e.g., oscillating) air stream. Similarly, the nozzles 120 may be configured to be readily cleaned or eliminate debris and scaling. For example, the nozzles 120 may be formed or may include a rubber or other flexible material, allowing scaling to be removed by flexing or moving the nozzle 120.

The nozzle 120 may be configured to be positioned at an angle relative to the top surface 124 of the fluid body 110. The angle may be generated based on an angle of a pipe extension defining the outlet, the via coupling of the nozzle 120 to the pipe 114, and/or a configuration of the pipe 114 (e.g., by rotating the pipe 114 relative to the top surface 124 of the fluid body 110).

Figure 4:
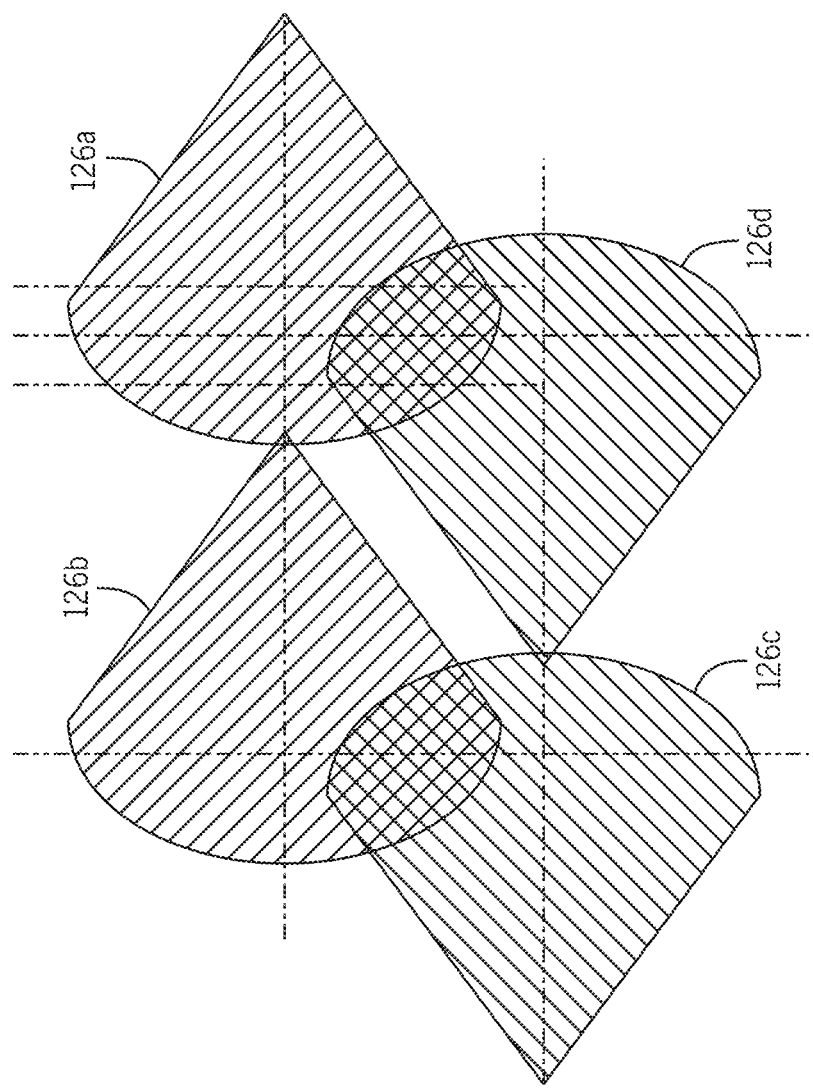
FIG. 4 illustrates a top plan view of a spray pattern arrangement for the system of FIG. 1.

With reference again to FIG. 2B, in some embodiments, the nozzles 120 and/or outlets 116a, 116b, 116c, 116d, 116e, 116f may be arranged so as to be staggered or offset from one another (e.g., at different longitudinal locations). For example, the outlets on adjacent sides of the pipe 114 may be configured to be offset from a horizontal position of outlets on the opposite side of the pipe 114. The staggered implementation may assist in maximizing the agitation area on the fluid body 110 without substantial overlap between adjacent pipes 114 (reducing interference of generated fluid droplets and agitation). An example of the air spray volume in a staggered implementation is shown in FIG. 4, where two pipes 114 are arranged as to be parallel and adjacent to one another. With reference to FIG. 4, the air stream volumes 126a, 126b, 126c, 126d may be defined as substantially rounded top cones and due to the staggering, the conical volume is maximized so as to only partially overlap, ensuring that the maximum area of the top surface 124 is agitated and with reduced interference from the adjacent nozzles. However, in other embodiments, the outlets 116a, 116b, 116c, 116d, 116e, 116f may be configured to be aligned with outlets on the opposite side of the pipe 114.

Figure 5A:
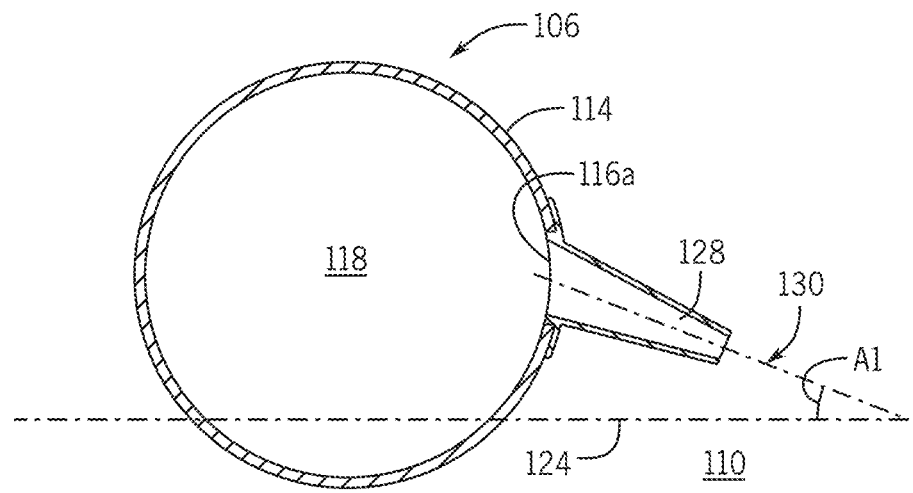
FIG. 5A illustrates a simplified cross-section view of a first example of a nozzle configuration for emitting an air jet at an impact angle.

FIG. 5A is a simplified cross-section of the agitation assembly 106 similar to FIG. 3. With reference to FIG. 5A, the nozzles 120 may be orientated relative to the pipe 114 in order to allow the air stream 120 to have a relatively shallow impact angle A1 relative to the top surface 124 of the fluid body 110. The impact angle A1 is selected to maximize the splash pattern and generate a movement of the fluid outwards from the pipe 114, as well as to generate droplets within the fluid. The impact angle A1 can be varied based on a position of the outlets 116a, 116b, 116c, 116d, 116e, 116f on the pipe 114, by positioning the pipe 114 at different locations relative to the fluid body 110 (e.g., raised above the top surface 124 or partially submerged and/or rotating the pipe 114), and/or by changing the nozzle 120 configuration. In one example, the impact angle A1 may be between 15 to 75 degrees and in one embodiment may be 20 degrees. The impact angle A1 is selected to prevent the air stream 130 from simply "churning" or generating bubbles within the fluid, but actually generate a fine spray of small droplets and forcing the fluid above the top surface 124 so as to have maximized impact with the ambient environment. As can be appreciated, the angle may be varied based on the type of fluid to be evaporated, the environment, the agitation stream temperature, outlet nozzle shape, and the like. As such, the description of any particular angle is meant as illustrative only.

Figure 5B:
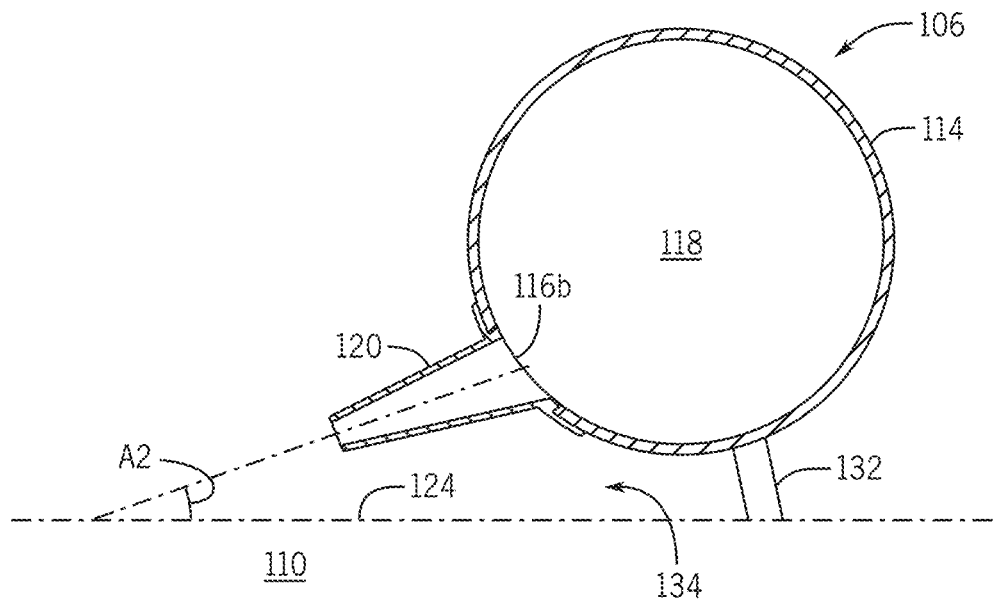
FIG. 5B illustrates a simplified cross-section view of a second example of a nozzle configuration for emitting an air jet at an impact angle.

FIG. 5B illustrates another example of the agitation assembly 106 where the pipe 114 is supported above the top surface 124 of the fluid body 110. For example, as shown in FIG. 5B, the pipe 114 may be arranged such that a bottom surface of the pipe 114 is raised above the top surface 124 of the water, e.g., the pipe 114 may be coupled to a support 132 that may be coupled to the containment walls 112 or anchored in a bottom surface of the containment. The support 132 may include a seat or top surface that is recessed to receive the pipe 114 and help prevent the pipe 114 from moving off of the support 132. In other embodiments, the support 132 may be secured to the pipe 114, e.g., via a fastener or adhesive.

In embodiments where the pipe 114 may be raised above the top surface of the fluid body, such as via the support 132, an air path 134 may be defined beneath the pipe 114 and air, such as wind, can flow beneath the pipe 114, and contact a larger area of the top surface 124 as compared to embodiments where the pipe 114 is positioned within the fluid, assisting in evaporation. In embodiments where the pipe 114 is arranged above the top surface 124, the pipe 114 may be less likely to fill or receive fluid therein, i.e., fluid waves cannot readily enter the fluid lumen 118 via the outlets 116a, 116b, 116c, 116d, 116e, 116f. Additionally, the outer surface of the pipe 114 may be less likely to collect debris, scaling, or the like, as the contaminates are deposited after evaporation, reducing cleaning and replacement actions as compared to other implementations. For example, the nozzles 120 and/or outlets 116a, 116b, 116c, 116d, 116e, 116f may be less likely to clog or crust over as the fluid body 110 becomes more concentrated with containments.

Further, by using supports 132, the distance between the nozzle 120 and the top surface 124 of the fluid may be adjusted by increasing or decreasing the amount of fluid contained in the fluid body 110. This may allow easier tailoring of the angle for a particular set of environmental conditions (e.g., the type of containments or solids in the fluid, the ambient air temperature, the fluid temperature, agitation stream pressure, etc.), as compared to a floating system where the adjustment may be more difficult or impossible to implement. However, with floating systems, where the pipes 114 are configured to float on the fluid body 110, the alignment of the pipes 114 does not need to be adjusted. For example, with a supported system, the supports 132 will need to be adjusted based on the topography of the bottom surface of the fluid body 110, which often is not uniform, meaning that to have a uniform height of the system 100 and pipes 114 across the fluid body, the height of each support 132 used likely will need to be adjusted.

In this example, the impact angle A2 may be similar to the impact angle A1, but due to height differential of the pipe 114, the nozzle 120 may be oriented at a lower and different angle relative to a center axis of the pipe 114. In other words, because the pipe 114 is higher above the top surface 124 of the fluid body 110, the nozzle 120 is positioned on a lower region of the pipe 114 and at different angle to maintain a desired impact angle A2 of the air jet 130. As can be appreciated, multiple different outlet, nozzle, and pipe configurations and geometries can be used to maintain a desired impact angle A1, A2 and the examples shown here are meant as illustrative only.

Figure 6A:
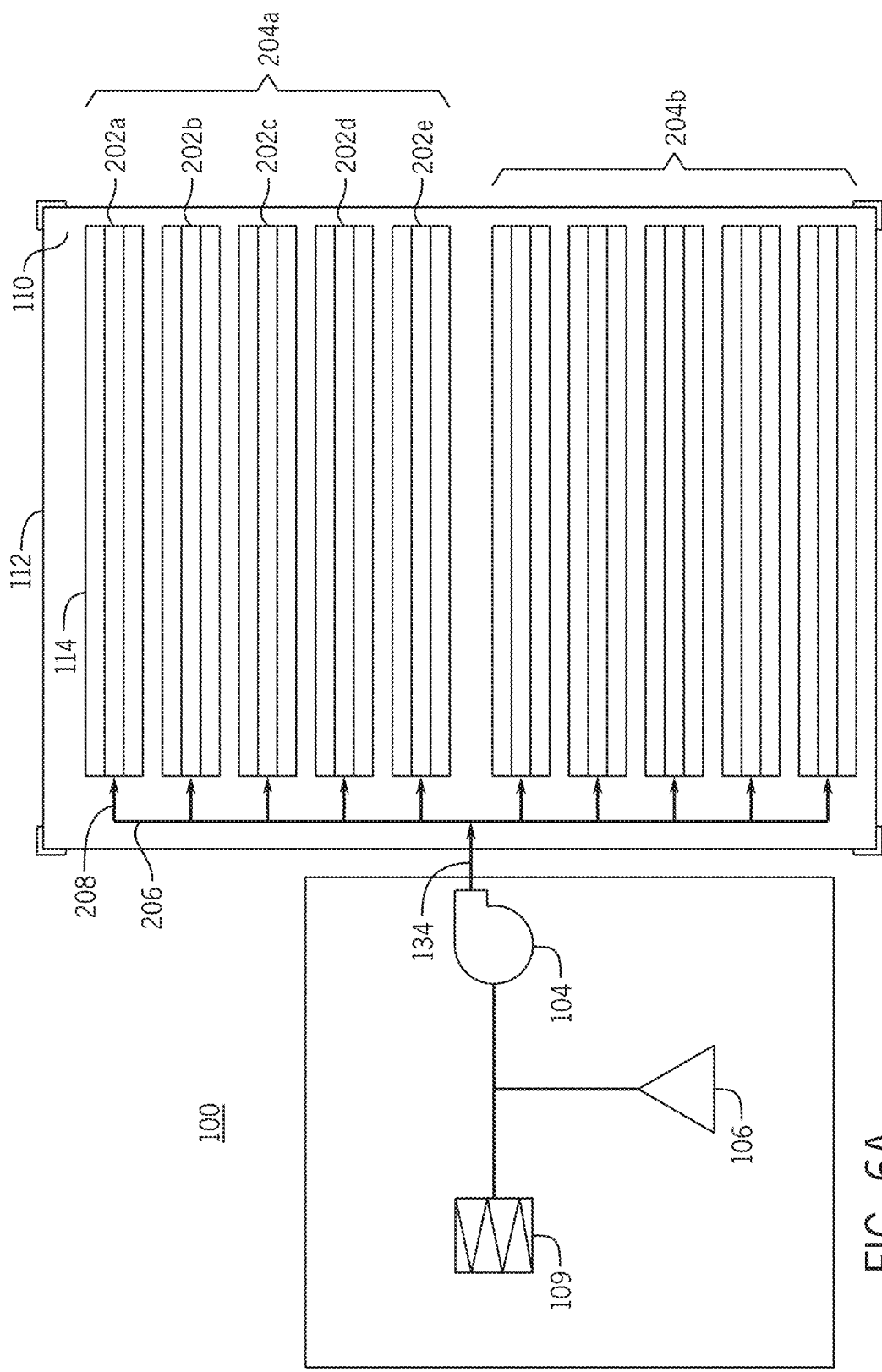
FIG. 6A illustrates a top plan view of a multiple pipe arrangement for the system of FIG. 1.

As mentioned, the agitation assembly 106 may include multiple branches of pipes 114 to ensure coverage across the entire top surface 124 (or substantial portion thereof) of the fluid body 110. FIG. 6A illustrates an example of a multi pipe 114 arrangement. With reference to FIG. 6A, the system 100 may include a plurality of pipes 114 that may be fluidly coupled to a head 134 or plenum distribution pipe, that provides the pressurized air from the pump 104 and/or heater 102 to the pipes 114, such as via the manifold 206. As can be appreciated, the pipes 114 may be arranged in parallel or concentric arrangement and the staggering of nozzles 120 may be used to assist in maximizing the covered area of the fluid body 110.

With reference to FIG. 6A, in some embodiments, the system 100 may include modules 204a, 204b that may have one more submodules 202a, 202b, 202c, 202d, 202e of pipes 114 fluidly coupled together. In one embodiment, the modules 204a, 204b are fluidly coupled together and receive the agitation fluid (e.g., air) from the same pump 104 or blower. In other embodiments, different modules 204a, 204 may be fluidly coupled to different pumps 104 and/or heater 106 components. The submodules 202a, 202b, 202c, 202d, 202e may include one or more pipes 114 that extend parallel to one another and may be mechanically coupled together. The number of pipes 114 in a particular submodule may vary based on the size and dimensions of the fluid body 110 and so while four pipe 114 lengths are shown in FIG. 6A, other implementations are envisioned.

FIGS. 6B-6D illustrate various views of an example of submodule 202a that may be used with the system 100. With reference to FIG. 6B, a pipe 114 portion of the submodule may include the one or more outlets 116a, 116n that may be defined along a length of the pipe 114. As described with respect to FIG. 1, the outlets 116a, 116n may be staggered to be at alternating locations at different sides of the pipe 114 along the length. Additionally, the pipe 114 may include a connection portion 212 that couples to or is formed with a connector 210. The connector 210 may be configured to connect to a corresponding distribution pipe 208 (see FIG. 7), and so may include threading or another fastener to allow a secured connection. The connection portion 212 may be configured to allow flexing or other movement of the pipe 114 portion relative to the connector 210, such as to allow some movement without breaking the connection to the distribution pipe 208. In one example, the connection portion 212 may be formed via a joint or a flexible material that allows deformation or movement without breaking.

With reference to FIGS. 6C and 6D, in some examples, an end portion 216 may extend between and fluidly connect the different pipes 114 within the submodule 202a. For example, the end portion 216 may be defined as a hollow or partially hollow tube that mechanical couples to the different pipes 114 and allows fluid flow therebetween. The end portion 216 may be connected to the pipes 114 directly via a connector or molding and/or optionally may include a flexible portion, such as elbows 214 or the like that allow movement of the pipes 114 relative to the end portion 216, without disconnecting or decoupling the pipes 114 from the end portion 216. The various connections between the different pipes 114 helps to ensure that the airflow in each of the pipes 114 across the system 100 are substantially similar. For example, if a first pipe 114 is closer to the pump 104 or otherwise has airflow that is higher than an adjacent pipe 114, the end portion 216 that fluidly couples the two pipes 114 together, allows excess airflow from a first pipe to flow into the second pipe, boosting the air pressure and air flow speed into the slower pipe. In general, the system 100 may be configured to have substantially the same airflow for all outlets of the system, including those that are adjacent to or near the head 134 and those that are further away.

Figure 7:
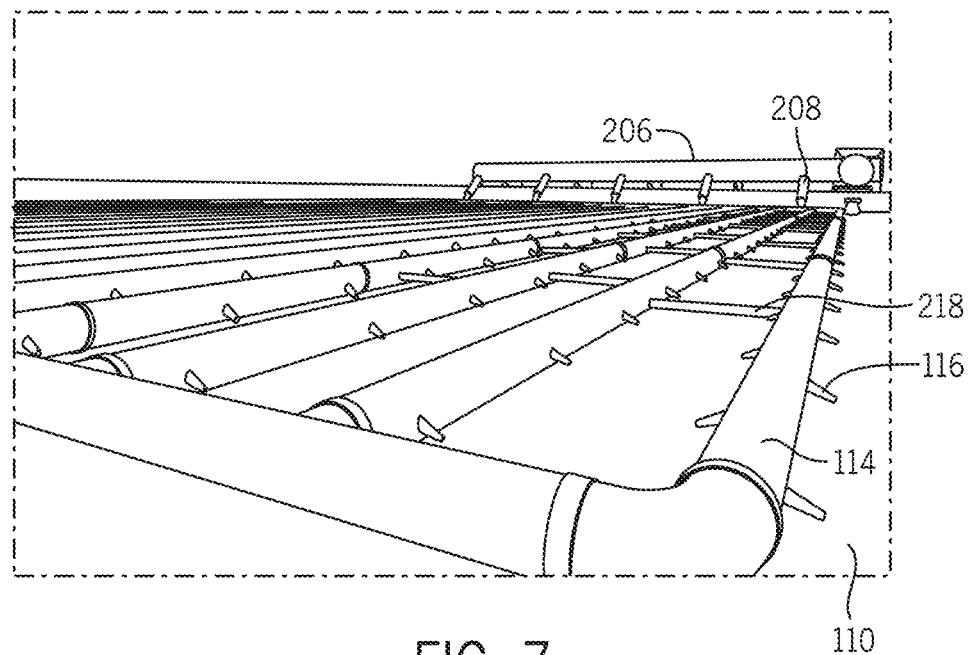
FIG. 7 illustrates a perspective view of a floating embodiment of the system of FIG. 1.
Figure 8:
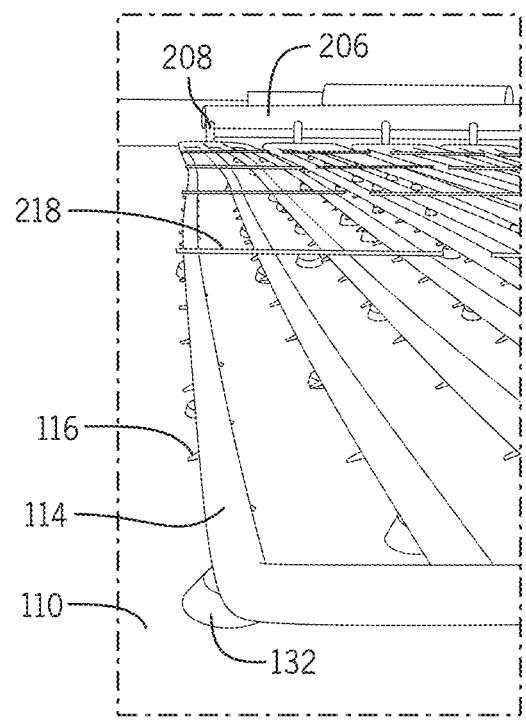
FIG. 8 illustrates a perspective view of a supported embodiment of the system of FIG. 1.

FIGS. 7 and 8 illustrate views of embodiments of the system 100. In FIG. 7, the pipes 114 are arranged to float on the fluid body 110 and do not require supports within the fluid body to support the pipes 114 in the fluid body 110. In FIG. 8, the pipes 114 are supported via the supports 132 within the fluid body 110. In both embodiments, the pipes 114 are coupled to manifold 206 via the distribution pipes 208. The distribution pipes 208 include flexible connections at either or both to the manifold location and at the pipe 114 location. The flexibility allows the pipes 114 to move in the fluid body 110, such as due to weather, without disconnecting the pipes 114 from the distribution pipes 208 and/or manifold 206. Additionally, in some embodiments, the pipes 114 may be coupled to adjacent pipes 114 and/or all pipes 114 within the submodule 202a, such as via cross links or crossbeams 218. The crossbeams 218 help to impart rigidity to the pipes 114 and help reduce movement of the pipes 114 relative to the manifold 206 and distribution pipes 208. For example, often in the operating environment, one side of the pipes 114 may heat up (e.g. due to sun exposure), and the crossbeams 218 to help to reduce flexing or movement due to changes in size or shape such as due to expansion or contraction.

It should be noted that in some embodiments, the manifold 206 or duct may be used to distribute to multiple modules 204a, 240b. In instances where a single pump 104 is used, the diameter of the manifold 206 may be reduced as the distance is longer from the outlet of the pump 104. In other words, the diameter of the manifold 206 may be changed to compensate for changes in air speed to help maintain the velocity of the air or other fluid across the various pipes 114 of the modules 204a, 204b. Alternatively, the diameter may be the same and additional pumps 104 may be used to eliminate large changes in air speed, where the different modules 204a, 204b may have different pumps 104 and may not be fluidly coupled to each other.

With reference again to FIG. 1, in operation, the ambient air 108 is passed through the heater 102, such as being pulled in via a vacuum generated by the pump 104. The air 108 receives the heat energy and raises in temperature and is continued to be pulled through the system 100. The pump 104 then pressurizes the air, increasing the pressure, and provides the pressurized air to the agitation assembly 106 to be deposited to the fluid body 110. Specifically, the air 108 is transported through the head 134 and to the manifold 206, distribution pipes 208, to the fluid lumen 118 within the one or more pipes 114.

As the air travels within the fluid lumen 118, the air (or other agitation fluid) reaches the different outlets 116a, 116b, 116c, 116d, 116e, 116f and travels through the outlet lumen 122 and into the nozzles 120. The nozzles 120 then output the air jet 130, where the spray pattern of the air jet 130 is based on the nozzle 120 configuration and orientation. The air jet 130 impacts the top surface 124 of the fluid body 110 and causes a fluid regime change and generates droplets of the fluid. The droplets are raised above the top surface 124, allowing the droplets to be more readily evaporated into the environment. It should be noted that although the system 100 may be generally used in outdoor environment, in some embodiments the system 100 may be implemented in controlled environments, such as within an industrial plant. In these instances, the heater 102 may be omitted and/or the ambient air environment may be selected to help maximize or increase evaporation, e.g., the humidity of the ambient air may be controlled and a fan or other element can be configured to generate air movement, assisting with the evaporation.

The system 100 may have enhanced energy efficiency as compared to conventional systems as the air jets 130 are above and not within the fluid body 110. This reduces the pressure required to expel the air jets 130 as the system 100 does not have to overcome a fluid pressure covering the outlets. Further, as mentioned, the arrangement of being over the top surface 124 helps to allow less cleaning of the system 100 and ensure performance as scaling and debris are less likely to collect on the pipe 114 and nozzles 120, and as cleaning may be needed it is easier to accomplish as the pipes 114 are not fully submerged in the fluid body 110.

Utilizing the system 100 as described herein can enhance evaporation of fluid, including fluids with a substantial number of total dissolved solids and/or total suspended solids. Evaporation ponds utilizing a sprayer, such as a turbo sprayer, require a filter positioned between the sprayer or blower. These filters become clogged quickly due to the high level of dissolved or suspended solids and debris generally within the fluid, and the replacement requires downtime and maintenance efforts to replace. On the contrary, the system 100 may utilizing air (rather than another type of fluid, such as water) a filter does not need to be positioned between the pump 104 and the pipes 114, as debris and solids in the fluid body 110 is not entering into the system via the air intake or the like.

Further, as compared to conventional evaporation ponds, the system 100 has substantially reduced scaling on the outlets 116 and pipes 114 because the outlets 116 are not positioned within or submerged within the fluid body 110. Further, because most of the evaporation of the fluid is occurring away from the mechanical aspects of the system 100, i.e., the evaporation is occurring in the air, away from the pipes 114 and outlets 116, and so scaling will not occur as much on the pipes 114 or outlets themselves as compared to other systems. Due to this, the system 100 can handle higher total dissolved solids (often close to the crystallization level) where such levels are not adequately handled by conventional evaporation solutions. Additionally, the system has a reduce number of moving parts as compared conventional evaporation systems, allowing for reduced cost and increased reliability.

By introducing heat into the agitation stream (e.g., air stream), the system 100 can increase evaporation volumes in the summer months as compared to conventional evaporation ponds. Further, unlike conventional evaporation ponds, the system 100 can operate year round, since introducing heat to the agitation stream helps to prevent the formation of ice on the fluid body, such as during the winter.

Also, while specific configurations of the outlets and nozzles have been discussed, it should be noted that these are meant as illustrative only. For example, the nozzles may be mounted at different angles relative to the pipe and the pipe can be rotated in position on the fluid body to generate a different angle. Further, the airflow speed and outlet stream shape, as well as height above the top surface of the fluid body may determine a desired angle and configuration for the outlets and nozzle.

CONCLUSION

The methods and systems are described herein with reference to wastewater evaporation. However, these techniques are equally applicable to other types of systems where evaporation may be desired. Additionally, the discussion of any particular embodiment is meant as illustrative only. Further, features and modules from various embodiments may be substituted freely between other embodiments.

It should be noted that any feature, component, or operation described with respect to one embodiment or example may be used with any other embodiment or example. In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A system for assisting in evaporation of a fluid body comprising:
a pump configured to pressurize air; and
an agitation assembly fluidly coupled to the pump, wherein the agitation assembly comprises an air nozzle comprising an outlet aperture positioned above a top surface of the fluid body and oriented to emit an air stream from above the top surface that impacts the top surface of the fluid body, wherein the impact of the air stream with the top surface generates droplets that travel above the top surface.

2. The system of claim 1, wherein the agitation assembly comprises:
a pipe that receives the pressurized air; and
the nozzle in fluid communication with the pipe.

3. The system of claim 2, wherein the nozzle comprises a first nozzle and a second nozzle, wherein the first nozzle is located on a first side of the pipe and the second nozzle is located on a second side of the pipe and the first nozzle and the second nozzle are at different locations along a length of the pipe.

4. The system of claim 1, wherein the air stream impacts the top surface at an impact angle that ranges between 15 to 75 degrees.

5. The system of claim 1, further comprising a heater that heats air and provides the heated air to the pump.

6. The system of claim 1, wherein the agitation assembly comprises a pipe comprising a plurality of outlets, wherein the outlets are positioned on a first side and a second side of the pipe to direct the air stream at different portions of the fluid body.

7. The system of claim 1, wherein the agitation assembly comprises a plurality of air nozzles positioned above the top surface of the fluid body.

8. The system of claim 1, wherein the air comprises a mixture of air and water.

9. The system of claim 1, wherein the agitation assembly comprises:
a network of pipes that receives the pressurized air and configured to allow movement of the pipes relative to each other; and
the nozzle in fluid communication with the network of pipes.

10. The system of claim 9, further comprising a manifold to distribute the pressured air to the network of pipes.

11. The system of claim 9, wherein the network of pipes is seated at least partially above the top surface of the fluid body.

12. The system of claim 1, further comprising a pipe to distribute the pressurized air to the air nozzle.

13. The system of claim 1, wherein the outlet aperture is positioned above and oriented towards the top surface while air is both flowing and not flowing in the system.

14. The system of claim 1, wherein the droplets are in the form of a fine spray of fluid and maximize an exposed surface area of the droplets with an environment around the fluid body.

15. The system of claim 1, wherein the agitation assembly further comprises a pipe coupled to the air nozzle, wherein the pipe and air nozzle are configured to prevent fluid from entering into the pipe via the air nozzle.

16. The system of claim 1, wherein the air stream travels from the outlet aperture to the top surface of the fluid for a distance above the top surface of the fluid body before impact.

17. The system of claim 16, wherein an impact angle is defined by a path of the air stream from the outlet aperture relative to the top surface of the fluid body, wherein the impact angle is between 15 to 75 degrees.

18. A method for evaporating fluid comprising:
pressurizing air received from an environment surrounding the fluid;
generating an air stream from the pressurized air, wherein the air stream is generated by one or more air nozzles comprising one or more outlet apertures arranged above and oriented towards a top surface of the fluid;
applying, via the one or more air nozzles, the air stream to the top surface of the fluid to agitate the fluid via impact of the air stream with the top surface from above, wherein the impact generates a spray of fluid from the top surface and into the air to encourage evaporation of the fluid.

19. The method of claim 18, wherein the air stream is applied at an impact angle that is less than 30 degrees relative to the top surface of the fluid.

20. The method of claim 18, further comprising heating air received from the environment.

21. The method of claim 18, wherein the spray of fluid generates droplets above the top surface of the fluid.

22. The method of claim 18, wherein the air stream forms a conical shape.

23. A system for evaporating a wastewater pond comprising:

a pump configured to pressurize an agitation fluid; and an agitation assembly fluidly coupled to the pump, wherein the agitation assembly comprises a plurality of outlets comprising a plurality of outlet apertures positioned above a top surface of the wastewater pond and oriented to emit multiple jets of the agitation fluid from above the top surface that impact the top surface of the wastewater pond, wherein the impact of the multiple jets of the agitation fluid with the top surface generates droplets that travel above the top surface, wherein the multiple jets have substantially the same velocity and pressure.

24. The system of claim 23, wherein the agitation assembly comprises:
   a pipe positioned within the wastewater pond; and
   the plurality of outlets in fluid communication with the pipe, wherein the multiple jets are emitted by the plurality of outlets.

25. The system of claim 24, wherein the pipe comprises a plurality of pipes that are seated partially above the wastewater pond, wherein the plurality of pipes are fluidly coupled together and to the pump.

26. The system of claim 23, wherein the wastewater pond comprises dissolved and suspended solids.

27. A system for assisting in evaporation of a fluid body, comprising:
   a pump configured to pressurize air;
   an agitation assembly fluidly coupled to the pump, wherein the agitation assembly comprises an air nozzle positioned above a top surface of the fluid body and oriented to emit an air stream that impacts the top surface of the fluid body from above, wherein the impact of the air stream with the top surface generates droplets above the top surface; and
   a pipe to distribute the pressurized air to the air nozzle, wherein the air nozzle extends first laterally and then downwards from a sidewall of the pipe to position the air nozzle below a center axis of the pipe.

28. The system of claim 12, wherein the air nozzle extends laterally and downwards to define an impact angle relative to the top surface.

* * * * *